US008898466B1

(12) United States Patent
Goel et al.

(10) Patent No.: US 8,898,466 B1
(45) Date of Patent: *Nov. 25, 2014

(54) SECURE BLOCK ACKNOWLEDGEMENT MECHANISM FOR USE IN COMMUNICATION NETWORKS

(71) Applicant: Marvell International Ltd., Hamilton (BM)

(72) Inventors: Sandesh Goel, Nioda (IN); Harish Ramamurthy, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,219

(22) Filed: Jan. 6, 2014

Related U.S. Application Data (63) Continuation of application No. 12/776,186, filed on May 7, 2010, now Pat. No. 8,627,074.

(60) Provisional application No. 61/177,452, filed on May 12, 2009.

(51) Int. Cl.
| | |
|---|---|
| *H04L 9/32* | (2006.01) |
| *H04K 1/00* | (2006.01) |
| *H04L 29/06* | (2006.01) |

(52) U.S. Cl.
CPC ..................................... *H04L 63/12* (2013.01)
USPC ......................................... 713/168; 380/255

(58) Field of Classification Search
CPC ....... H04L 63/08; H04L 63/0428; H04L 9/08; H04L 9/00
USPC .......................................... 713/168; 380/255
See application file for complete search history.

(56) References Cited

U.S. PATENT DOCUMENTS

| 8,341,270 B2* | 12/2012 | Mazzaferri et al. ........... 709/227 |
| 8,341,732 B2* | 12/2012 | Croft et al. ........................ 726/21 |
| 2005/0041586 A1* | 2/2005 | Jiang .............................. 370/236 |

(Continued)

OTHER PUBLICATIONS

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

(Continued)

*Primary Examiner* — Teshome Hailu (57) ABSTRACT

Secure block acknowledgment techniques for use in communication networks are discussed. In one embodiment, a method includes setting up a session with a transmitting station in which the transmitting station is to perform a block acknowledgment to confirm receipt of packets, the session including determining whether the transmitting station has a capability to implement a mechanism to securely perform a block acknowledgement. The embodiment includes receiving an information unit including information indicative of a request for the communication device to adjust a receiving window associated with the session, determining whether the received information unit is in accordance with the mechanism, adjusting the receiving window if the received information unit is in accordance with the mechanism, and not adjusting the receiving window if (i) the received information unit is not in accordance with the mechanism, and (ii) the transmitting station is determined to have the capability to implement the mechanism.

26 Claims, 7 Drawing Sheets

(56) References Cited

U.S. PATENT DOCUMENTS

| | | | |
|---|---|---|---|
| 2005/0160265 A1* | 7/2005 | Tanaka et al. | 713/168 |
| 2006/0095969 A1 | 5/2006 | Portolani et al. | |
| 2006/0133409 A1 | 6/2006 | Prakash et al. | |
| 2008/0072033 A1 | 3/2008 | McAlister | |
| 2013/0100797 A1* | 4/2013 | Ray et al. | 370/216 |

OTHER PUBLICATIONS

IEEE Std 802.11e/D11.0, Oct. 2003 (Amendment to ANSI/IEEE Std 802.11, 1999 (Reaff 2003)) "IEEE Standard for Information technology—Telecommunications and information exchange between systems—Local and metropolitan area networks—Specific requirements, Part 11: Wireless Medium Access Control (MAC) Quality of Service (QoS) Enhancements," *The Institute of Electrical and Electronics Engineers, Inc.*, Oct. 2004.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

"IEEE P802.11 nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11nTM IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

* cited by examiner

SECURE BLOCK ACKNOWLEDGEMENT MECHANISM FOR USE IN COMMUNICATION NETWORKS

CROSS-REFERENCE TO RELATED APPLICATION

This application is a continuation of U.S. patent application Ser. No. 12/776,186, filed on May 7, 2010, which claims the benefit of U.S. Provisional Patent Application No. 61/177,452, entitled "Methods to Detect and Prevent Denial of Service (DoS) Attacks When Using Blockack Mechanisms for Data Transfer," which was filed on May 12, 2009, the entire disclosure of each of which are hereby incorporated by reference herein in their entireties.

FIELD OF TECHNOLOGY

The present disclosure relates generally to communication networks and, more particularly, to secure block acknowledgment mechanisms in communication networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technology is described in detail in the IEEE 802.11 Standards, including for example, the IEEE 802.11a (1999) Standard and its updates and amendments, the IEEE 802.11g (2003) Standard, as well as the IEEE 802.11e, the IEEE 802.11n and the IEEE 802.11w Standards, all of which are collectively incorporated herein fully by reference. These standards have been or are in the process of being commercialized with the promise of increased accuracy and efficiency of data transmission, making them a strong competitor to traditional wired Ethernet and "802.11b" or "WiFi" 11 Mbps mobile wireless transmission standard.

Despite the advances in wireless communication technology, data that is transmitted via wireless communication systems sometimes fails to reach its destination in a proper manner, e.g., as a result of channel imparities, failure of network devices, power loss, etc. As a result, various techniques have been developed to monitor and account for data loss, and some of the most common such techniques utilize acknowledgement-based mechanisms. Generally, under acknowledgement-based mechanisms, when a transmitting station, referred to as an "originator," transmits information to a receiving station, referred to as a "recipient," and that information is properly received at the recipient, the recipient transmits an acknowledgement back to the originator, acknowledging proper receipt of that information. Therefore, if the originator transmits information to the recipient but does not receive an acknowledgment for that information, it may be inferred at the originator that the transmitted information was not received properly, and the originator may retransmit that information to the recipient.

Typically, originators and recipients communicate information using information units (e.g., frames, packets, and so on), and under traditional acknowledgement-based mechanisms, recipients separately acknowledge the receipt of each information unit. One issue associated with these traditional mechanisms that acknowledge separately each individual information unit is that they often lead to significant overhead that results in suboptimal performance, e.g., with respect to bandwidth utilization. This may be particularly problematic in wireless communication systems, in which bandwidth is often a scarce resource.

In order to address this issue, and to improve efficiency of bandwidth utilization, a block acknowledgement (BA) mechanism has recently been defined in the IEEE 802.11e Standard. Generally, the BA mechanism enables the recipient to acknowledge the receipt of multiple information units (or a "block" of information units) at the same time.

SUMMARY

In one embodiment, a method includes setting up a session with a transmitting station in which the transmitting station is to perform a block acknowledgment to confirm receipt of a plurality of packets, the session including determining whether the transmitting station has a capability to implement a mechanism to securely perform a block acknowledgement. The embodiment includes receiving an information unit including information indicative of a request for the communication device to adjust a receiving window associated with the session, determining whether the received information unit is in accordance with the mechanism, adjusting the receiving window if the received information unit is in accordance with the mechanism, and not adjusting the receiving window if (i) the received information unit is not in accordance with the mechanism, and (ii) the transmitting station is determined to have the capability to implement the mechanism.

In another embodiment, an apparatus includes a communication device having a communication interface configured to receive an information unit during a session with a transmitting station, the information unit including information indicative of a request for the communication device to adjust a receiving window associated with a block acknowledgement session. The apparatus also includes a secure block acknowledgement engine configured to set up, prior to receiving the information unit, the block acknowledgement session with the transmitting station, including determining whether the transmitting station has a capability to implement a secure block acknowledgement mechanism while setting up the block acknowledgement session, determine whether the received information unit is in accordance with the secure block acknowledgement mechanism, adjust the receiving window if the received information unit is in accordance with the secure block acknowledgement mechanism, and not adjust the receiving window if (i) the received information unit is not in accordance with the secure block acknowledgement mechanism, and (ii) the transmitting station is determined to have the capability to implement the secure block acknowledgement mechanism.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

System Overview

Figure 1:
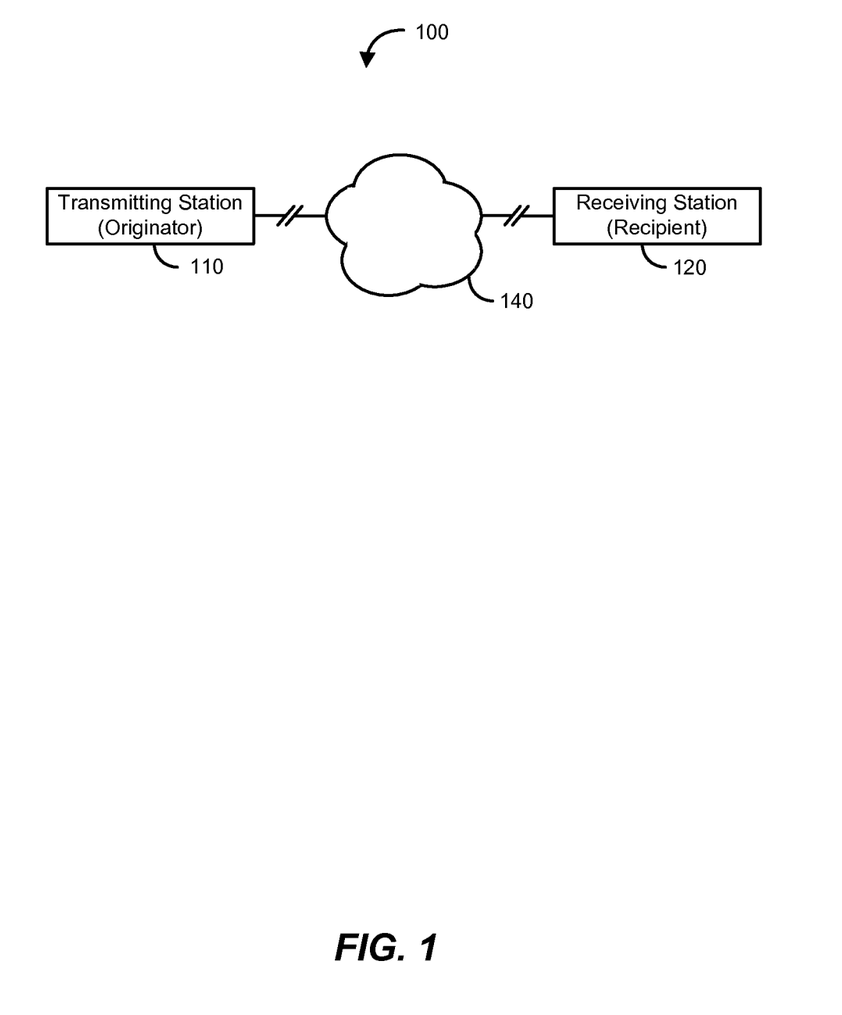
FIG. 1 is a block diagram of an example wireless communication system that includes secure block acknowledgement capabilities.

FIG. 1 is a block diagram of an example wireless communication system 100 that includes secure BA capabilities. The example wireless communication system 100 includes a number of stations ("STA") 110, 120, such as originators 110 and recipients 120, communicatively coupled via a network 140 that facilitates communication of information between the stations 110, 120. Generally, in order to communicate information, an originator 110 forms that information into one or more information units and transmits those information units to the recipient 120 via the network 140.

For ease of explanation, example secure BA mechanisms will be described in the in the context of Layer 2 (also known as the "Data Link Layer") of the Open System Interconnection Reference Model ("OSI Model") of computer networking. However, it will be understood that the stations 110, 120, as well as the present disclosure in general, are not limited to any particular layer of the OSI Model. Therefore, terms and phrases that are typically associated with Layer 2 of the OSI Model, when used herein, should not be understood as limiting the scope of the present disclosure to the Data Link Layer. For example, although, for ease of explanation, the information units used for transmitting information from the originator 110 to the recipient 120 will be referred to as a "frames," it will be understood that the term "frame" may refer to information units other than Layer 2 frames, such as packets, messages, etc.

Furthermore, it will be understood that the present disclosure is not limited to any particular topology of the network 140, or to any particular function or placement of the stations 110, 120 in the network. For example, the stations 110, 120 may be located at the edge of the wireless communication system 100, or they may be intermediate network devices that are part of the network backbone interconnecting different networks. Stations 110, 120 may be end hosts (e.g., personal computers, laptops, printers, copier systems, scanners, personal digital assistants (PDAs), wireless phones and other devices, fax machines, and so on) or intermediate network devices (e.g., bridges, routers, hubs, firewalls, proxies, and so on). Furthermore, although, for ease of explanation, FIG. 1 illustrates a single originator 110 and a single recipient 120, it will be understood that the example secure block acknowledgement mechanisms may be utilized in wireless communication systems that include any number of originators 110, recipients 120, or other stations that, for example, may be capable of both transmitting and receiving information.

Additionally, although for ease of explanation, secure block acknowledgment mechanisms will be described with regard to a single traffic identification (TID), it will be understood by one of ordinary skill in the art that the secure block acknowledgment mechanisms described herein may be utilized in a multi-TID environment, i.e., with multiple traffic identifications.

Conventional Acknowledgement-Based Mechanisms

Figure 2:
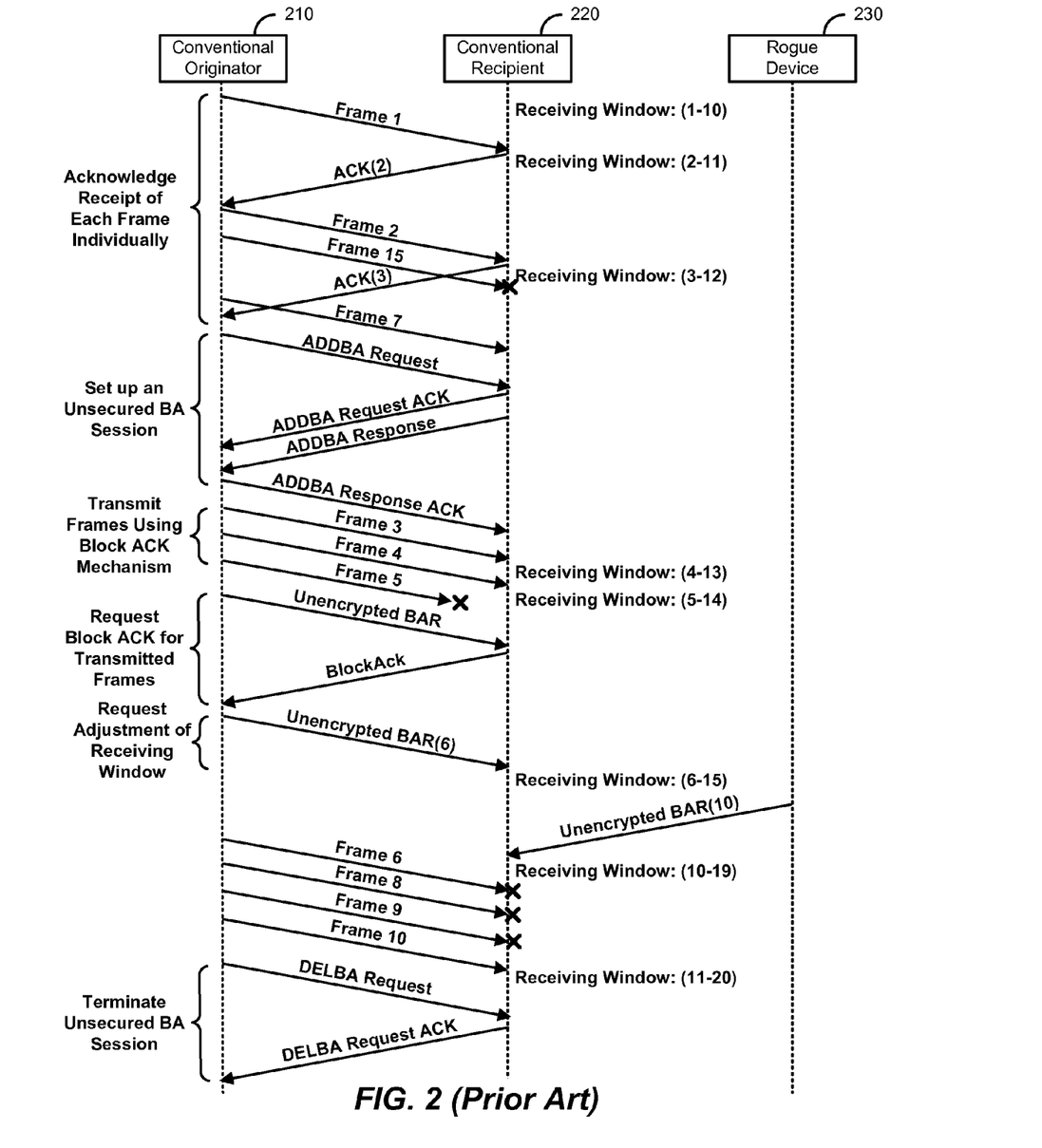
FIG. 2 is a message sequence diagram that illustrates some example conventional acknowledgment-based mechanisms implemented by conventional originators and recipients.

Before discussing the details of the secure block acknowledgement mechanisms, it is helpful to provide more details regarding conventional acknowledgement-based mechanisms implemented by conventional originators 210 and recipients 220.

FIG. 2 is a message sequence diagram that illustrates some example conventional acknowledgment-based mechanisms implemented by conventional originators 210 and recipients 220. As illustrated in FIG. 2, in order to acknowledge receipt of a frame from the originator 210, recipients 220 typically transmit special frames know as acknowledgement ("ACK") frames. Because frames, in general, include identifiers (e.g., sequence numbers) that identify individual frames, an ACK frame typically acknowledges receipt of a particular frame if the ACK frame includes an identifier of that particular frame, or an indication thereof. That is, to acknowledge receipt of a particular frame from an originator 210, the recipient 220 may transmit to the originator 210 an acknowledgement frame that includes the sequence number of the particular frame, the sequence number of the last frame received from the originator 210, the sequence number of the next expected frame, and so on.

In some instances, the recipient 220 may acknowledge the receipt of each frame from the originator 210 via a separate ACK frame. For example, as illustrated in FIG. 2, if the originator 210 transmits frame 1 (i.e., frame with a sequence number 1) to the recipient 220, the recipient 220 may respond with an acknowledgment frame ACK(2), indicating that the conventional recipient 220 is expecting frame 2 as the next frame. This provides the originator 210 with a confirmation that frame 1 has been received. Likewise, if the originator 210 transmits frame 2 to the recipient 220, the recipient 220 may respond with an acknowledgment frame ACK(3), confirming the receipt of frame 2 and indicating to the originator 210 that the recipient 220 is expecting frame 3 as the next frame.

In addition to sending acknowledgment frames to the originator 210, the recipient 220 typically maintains a sliding receiving window that defines which frames the recipient 220 may accept. Generally, the receiving window may be characterized by a start position ("WinStart$_R$"), an end position ("WinEnd$_R$"), a maximum window size ("WinSize$_R$"), or a combination thereof. Generally, WinStart$_R$ is the lowest sequence number of a frame that the recipient 220 may accept; WinEnd$_R$ is the highest sequence number of a frame that the recipient 220 may accept; and WinSize$_R$ relates to the maximum number of unacknowledged frames that the recipient 220 may accept. In some instances, WinSize$_R$=WinEnd$_R$−WinStart$_R$+1.

In the example illustrated in FIG. 2, for example, the recipient 220 maintains a sliding receiving window of 10 frames. At the outset of the communication between the originator 210 and the recipient 220, WinSize$_R$=10, WinStart$_R$=1, and WinEnd$_R$=10, meaning that the receiving window may accept frames 1-10. Once the recipient 220 receives frame 1, the receiving window of the recipient 220 is updated to accept frames 2-11. Likewise, after the recipient 220 receives frame 2, the receiving window of the recipient 220 is updated to accept frames 3-12. Thus, if after receiving frame 2 the recipient 220 receives frame 7, the recipient 220 will accept that frame, even though it was received out of order. However, if the recipient 220 receives frame 15, the recipient 220 will drop that frame because the sequence number 15 is outside of the receiving window.

In some instances, instead of acknowledging individually each frame transmitted by the originator 210 with a separate ACK frame, the originator 210 and the recipient 220 may employ an acknowledgement-based mechanism in which a single acknowledgment frame may be used to acknowledge receipt of a block of frames. An example of such a mechanism is the unsecured block acknowledgment (BA) mechanism, as originally defined in the IEEE 802.11e standard.

In order to employ the unsecured BA mechanism, the originator 210 and the recipient 220 typically need to set up an unsecured BA session and to negotiate the attributes of that BA session. To do so, the originator 210 may transmit a special unsecured BA session setup request frame that includes data indicative of a request to set up an unsecured BA session. In response, the recipient 220 may transmit a special unsecured BA session setup response frame that includes data indicative of the acceptance by the recipient 220 acceptance of the request to set up the unsecured BA session.

Examples of a special unsecured BA session setup request frame and the special unsecured BA session setup response frame are the Add Block Acknowledgement (ADDBA) request frame and the ADDBA response frame, as originally defined in the IEEE 802.11e standard. In addition to data indicative of a request to set up an unsecured block ACK session, the ADDBA request frame includes data indicative of various attributes associated with the unsecured block acknowledgment session, e.g., a dialog token field for matching the ADDBA request with the ADDBA response; a block ACK parameter set field for signaling the parameters for the unsecured block ACK session, such as WinSize$_R$, WinEnd$_R$ and WinStart$_R$; and a block ACK timeout value that specifies when the unsecured block ACK session expires. Similarly, in addition to data indicative of a response to a request for an unsecured block ACK session, the ADDBA response frame includes a the dialog token field, the block ACK parameter field and the block ACK timeout field (e.g., extracted from the ADDBA request session) and the ADDBA status code field, which indicates whether the recipient 220 granted or rejected the request for the unsecured block ACK session.

After setting up the unsecured BA session, the originator 210 may transmit multiple frames, or a "block" of frames, to the recipient 220 (e.g., frames 3-5, as illustrated in FIG. 2), and the recipient 220 may update the receiving window in response to each received frame. However, the recipient 220 is not required to acknowledge receipt of any of these frames until the originator 210 transmits a special frame that includes data indicative of a request for an acknowledgement for the transmitted block of frames. An example of such a frame is the unencrypted Block Acknowledgement Request ("BlockAckReq" or "BAR") frame, as originally defined in the IEEE 802.11e standard. When the recipient 220 receives the unencrypted BAR frame, the recipient 220 may acknowledge receipt of all of the frames that were, in fact, received, via a single acknowledgment frame that includes the status of multiple frames associated with the unsecured BA session. An example of such a frame is the Block Acknowledgement ("BlockAck" or "BA") frame, as originally defined in the IEEE 802.11e standard.

In the example illustrated in FIG. 2, frame 5 is not received properly at the recipient 220. Accordingly, in response to the unencrypted BAR frame from the originator 210, the recipient 220 may respond with a BlockAck that confirms the receipt of only frames 3-4 and indicates to the originator 210 that the recipient 220 is still waiting for frame 5. In response, the originator 210 may retransmit frame 5 (potentially several times until the recipient 220 acknowledges its receipt).

In some instances, the originator 210 may discard a lost frame (or frames) and instruct the recipient 220 to advance the starting position of the receiving window despite the lost frame. For example, the originator 210 may discard the lost frame 5 and instruct the recipient 220 to update the receiving window to start at the sequence number 6, for example. This may be done by sending an overloaded unencrypted BAR (6) frame, where the unencrypted BAR(6) frame is overloaded with additional data to specify the new starting position (i.e., 6) of the receiving window. When the recipient 220 receives the overloaded unencrypted BAR (6) frame, the recipient 220 adjusts the receiving window accordingly.

If, at some point, the originator 210 decides to terminate the unsecured block ACK session, the originator 210 may transmit a special block acknowledgment session termination frame that includes data indicative of a request to terminate the unsecured block acknowledgment session. An example of a block acknowledgment session termination frame is a Delete Block ACK (DELBA) request frame, as originally defined in the IEEE 802.11e standard. Upon the terminations of the unsecured block ACK session, frames transmitted from the originator 210 to the recipient 220 may be acknowledged individually with individual ACK frames, as described above.

There are several drawbacks associated with conventional BA mechanisms, such as the BA mechanism illustrated in FIG. 2. One such drawback is that conventional BA mechanisms provide limited or no security, which makes stations 210, 220 implementing such mechanisms vulnerable to attacks from rogue devices 230 230. For example, a rogue device 230 may transmit unencrypted overloaded BAR frames to the recipient 220, causing the recipient 220 to adjust the receiving window inappropriately. In the example illustrated in FIG. 2, for instance, if a rogue device 230 transmits an unencrypted overloaded BAR(10) frame before the recipient 220 receives frame 6, the rogue device 230 may cause the recipient 220 to adjust the receiving window to start at frame 10. As a result, data frames 6 and 8-9 transmitted from the originator 210 to the recipient 220 will be mistakenly dropped by the originator 210. Unencrypted overloaded BAR frames can therefore be used by rogue devices to carry out denial of service (DoS) attacks.

Secure Block Acknowledgement Mechanisms

Figure 3:
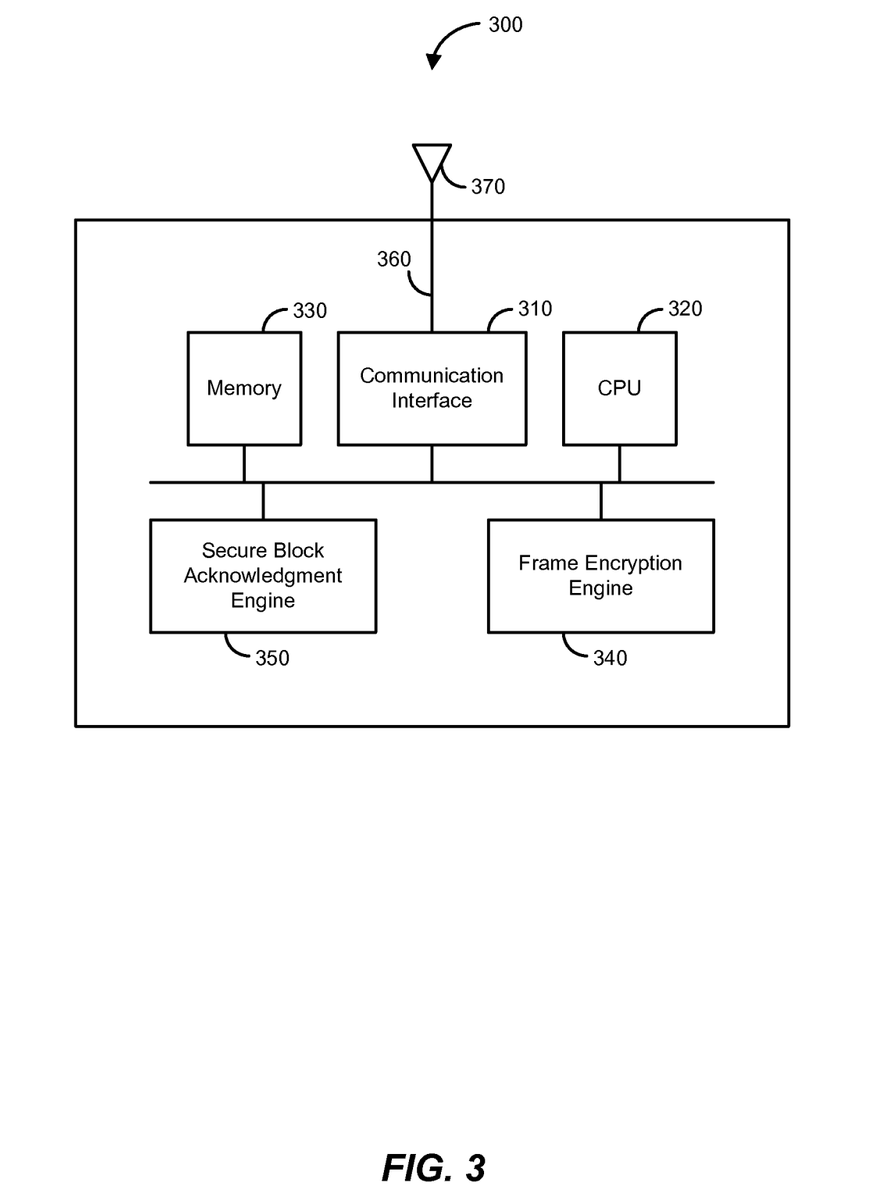
FIG. 3 is a block diagram of an example communication device that is configured to support communications employing secure block acknowledgement mechanisms.

FIG. 3 is a block diagram of an example communication device 300 (further "originator") that is configured to support communications employing secure BA mechanisms. The example originator 300 may be utilized in the example wireless communication system 100 of FIG. 1 as an originator 110. It will be understood, however, that the example originator 300 may be used in communication systems other than the wireless communication system 100.

The example originator 300 includes a communication interface 310 for transmitting and/or receiving frames to and/or from other communication devices (e.g., recipients) and a secure block acknowledgement engine 350 for implementing one or more secure block acknowledgement mechanisms. The example originator 300 further includes a frame encryption engine 340 that generally encrypts frames using a suitable encryption technique. Additionally, the example originator 300 includes a programmable processor, or a central processing unit (CPU) 320. The CPU 320 may execute computer-readable instructions stored in a memory 330 coupled to the CPU 320.

Figure 4:
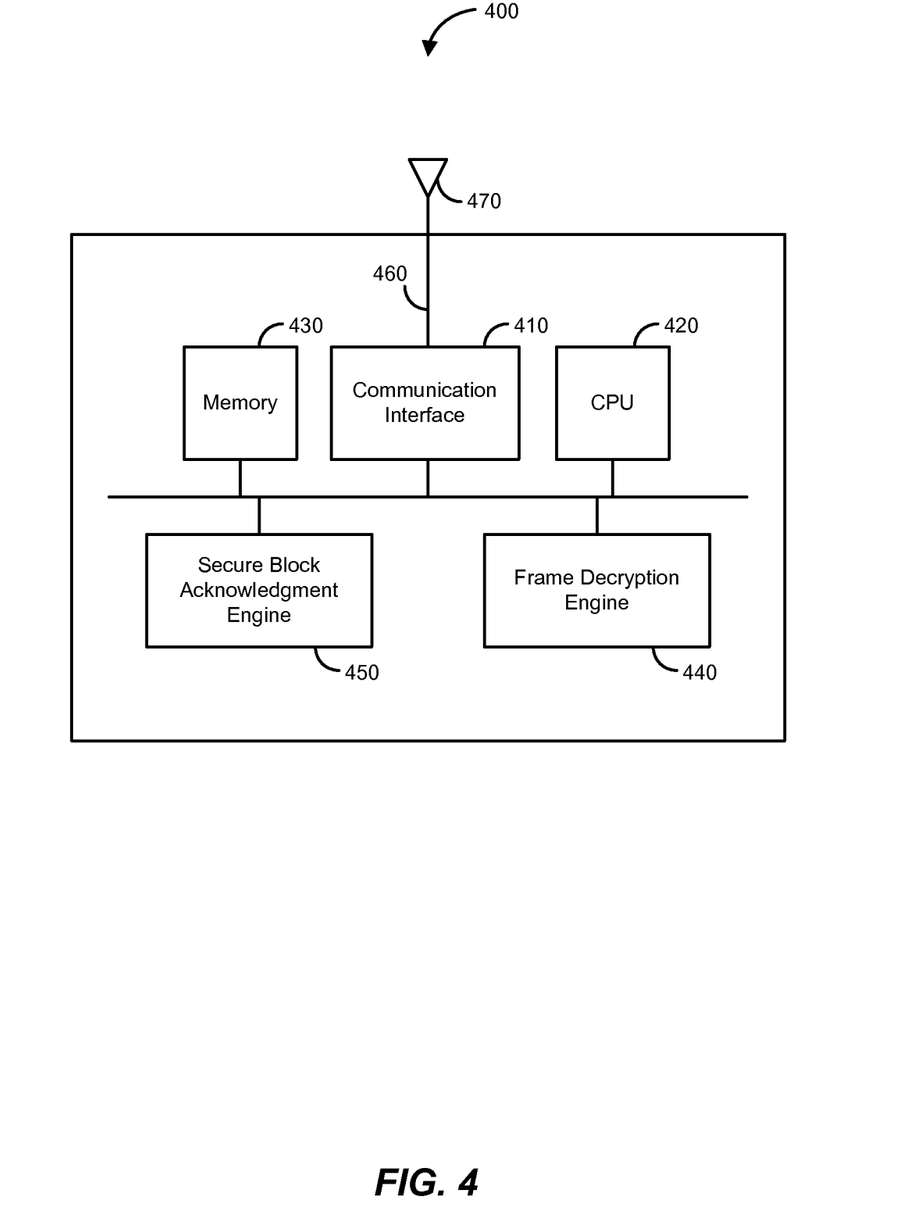
FIG. 4 is a block diagram of another example communication device that is configured to support communications employing secure block acknowledgement mechanisms.

FIG. 4 is a block diagram of an example communication device 400 (further "recipient") that is configured to support communications employing secure BA mechanisms. The example originator 400 may be utilized in the example wireless communication system 100 of FIG. 1 as a recipient 120. It will be understood, however, that the example recipient 400 may be used in communication systems other than the wireless communication system 100.

The example recipient 400 includes a communication interface 410 for receiving and/or transmitting frames to and/or from other communication devices (e.g., originators) and a secure block acknowledgement engine 450 for implementing one or more secure block acknowledgement mechanisms. The example recipient 400 further includes a frame decryption engine 440 that generally decrypts received frames. Additionally, the example recipient 400 includes a programmable processor, or a central processing unit (CPU) 420. The CPU 420 may execute computer-readable instructions stored in a memory 430 coupled to the CPU 420.

Figure 5:
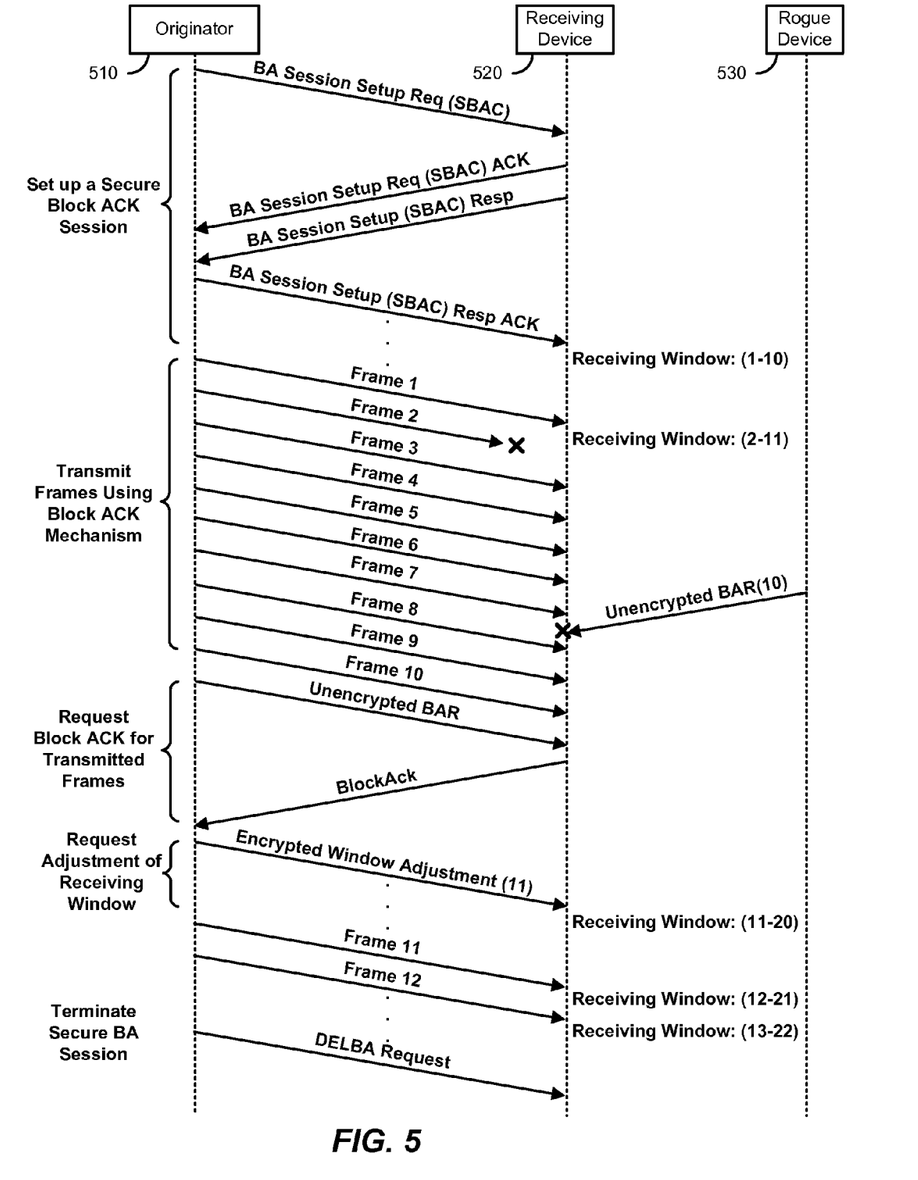
FIG. 5 is a message sequence diagram that illustrates an example communication employing a secure block acknowledgement mechanism.

FIG. 5 is a message sequence diagram that illustrates an example communication employing a secure BA mechanism. For ease of explanation, the example communication illustrated in FIG. 5 will be described with reference to FIGS. 1 and 3-4. However, it will be understood that the example communication illustrated in FIG. 5 may be implemented using originators, recipients and wireless communication systems other than those of FIGS. 1 and 3-4.

In some embodiments, in order to employ a secure BA mechanism, the originator 510 and the recipient 520 set up a BA session and communicate to each other their respective capabilities to implement the BA mechanism in a secure manner. To do so, the originator 510 may transmit a special BA session setup request frame that includes data indicative of a request to set up a BA session and data indicative of the capability of the originator 510 to implement the BA mechanism in a secure manner. In response to the BA session setup request frame, the recipient 520 may transmit to the originator 510 a special BA session setup response frame that includes data indicative of an acceptance of the request to set up the BA session by the recipient 520 and data indicative of the capability of the recipient 520 to implement the BA mechanism in a secure manner.

The originator 510 may communicate its capability to implement the BA mechanism in a secure manner via a special Secure BA Capability ("SBAC") field in the BA session setup request frame. In some embodiments, the BA session setup request frame may be an enhanced version of the ADDBA request frame, as originally defined in the IEEE 802.11e Standard. For example, BA session setup request frame may be an ADDBA request frame overloaded with the SBAC field indicating the capability of the originator 510 to implement the BA mechanism in a secure manner. In other embodiments, the BA session setup request frame may be separate from the ADDBA request frame and include the SBAC field, in addition to some or all of the data specified in the original IEEE 802.11e Standard for the ADDBA request frame. In some embodiments, the capability of the originator 510 to implement the BA mechanism in a secure manner may be communicated via a separate capability frame that does not include any of the data specified in the original IEEE 802.11e Standard for the ADDBA request frame.

Similar to the originator 510, the recipient 520 may communicate its capability to implement the BA mechanism in a secure manner via a special SBAC field in the BA session setup response frame. In some embodiments, the BA session setup response frame may be an enhanced version of the ADDBA response frame, as originally defined in the IEEE 802.11e Standard. For example, BA session setup response frame may be an ADDBA response frame overloaded with the SBAC field indicating the capability of the recipient 520 to implement the BA mechanism in a secure manner. In other embodiments, the BA session setup response frame may be separate from the ADDBA response frame and include the SBAC field, in addition to some or all of the data specified in the original IEEE 802.11e Standard for the ADDBA response frame. In some embodiments, the capability of the recipient 520 to implement the BA mechanism in a secure manner may be communicated via a separate capability frame that does not include any of the data specified in the original IEEE 802.11e Standard for the ADDBA response frame.

After setting up the BA session, the originator 510 and the recipient 520 may be aware of the other's capability to implement the BA mechanism in a secure manner. If both the originator 510 and the recipient 520 have that capability, they may subsequently implement a secure BA mechanism, the details of which are described below. If, one the other hand, one of the originator 510 or the recipient 520, or both, lacks that capability, the originator 510 and the recipient 520 may subsequently implement an unsecured BA mechanism, as described with respect to FIG. 2.

If both the originator 510 and the recipient 520 have the capability to implement a secure BA mechanism, the originator 510 may transmit a block of frames to the recipient 520 (e.g., frames 1-10, as illustrated in FIG. 5), and the recipient 520 may update the receiving window in response to each received frame. However, the recipient 520 is not required to acknowledge receipt of any of these frames until the originator 510 transmits BAR frame (after transmitting frame 10 in the example illustrated in FIG. 5). When the recipient 520 receives the unencrypted BAR frame, the recipient 520 may acknowledge receipt of all of the frames that were, in fact, received, via a single BlockAck frame.

In the example illustrated in FIG. 5, frame 2 is not received properly at the recipient 520. Accordingly, in response to the unencrypted BAR frame from the originator 510, the recipient 520 may respond with a BlockAck that confirms the receipt of only frames 1 and 3-10 and indicates to the originator 510 that the recipient 520 is still waiting for frame 2. In response, the originator 510 may retransmit frame 2 (potentially several times until the recipient 520 acknowledges its receipt) or discard a lost frame 2 and instruct the recipient 520 to advance the starting position of the receiving window (e.g., to frame 11) despite the lost frame 2. This may be done by sending an encrypted window adjustment action frame that includes data indicative of a request to adjust the receiving window, e.g., to advance the starting position of the receiving window to 11). In response to the encrypted window adjustment action frame, the recipient 520 can adjust the receiving window accordingly.

In some embodiments, the recipient 520 may be configured to adjust the receiving window in response to the encrypted window adjustment action frame but not in response to unencrypted overloaded BAR frames or to any frames that are not encrypted that include data indicative of a request to adjust the receiving window. Such a configuration of the recipient 520 can render the recipient 520 less vulnerable from attacks from rogue devices 530. For example, as illustrated in FIG. 5, if a rogue device 530 transmits an unencrypted overloaded BAR(10) frame to the recipient 520, the recipient 520 may drop the unencrypted overloaded BAR(10) frame. As a result, unlike conventional recipients, such as the conventional recipient 220 of FIG. 2), if the recipient 520 is configured to support communications employing secure BA mechanisms and receives the unencrypted overloaded BAR(10) frame from a rogue device 530 before the recipient 520 receives frames 8-9, the rogue device 530 will not cause the recipient 520 to adjust the receiving window to start at frame 10, thus losing frames 8-9 in the process.

Figure 6:
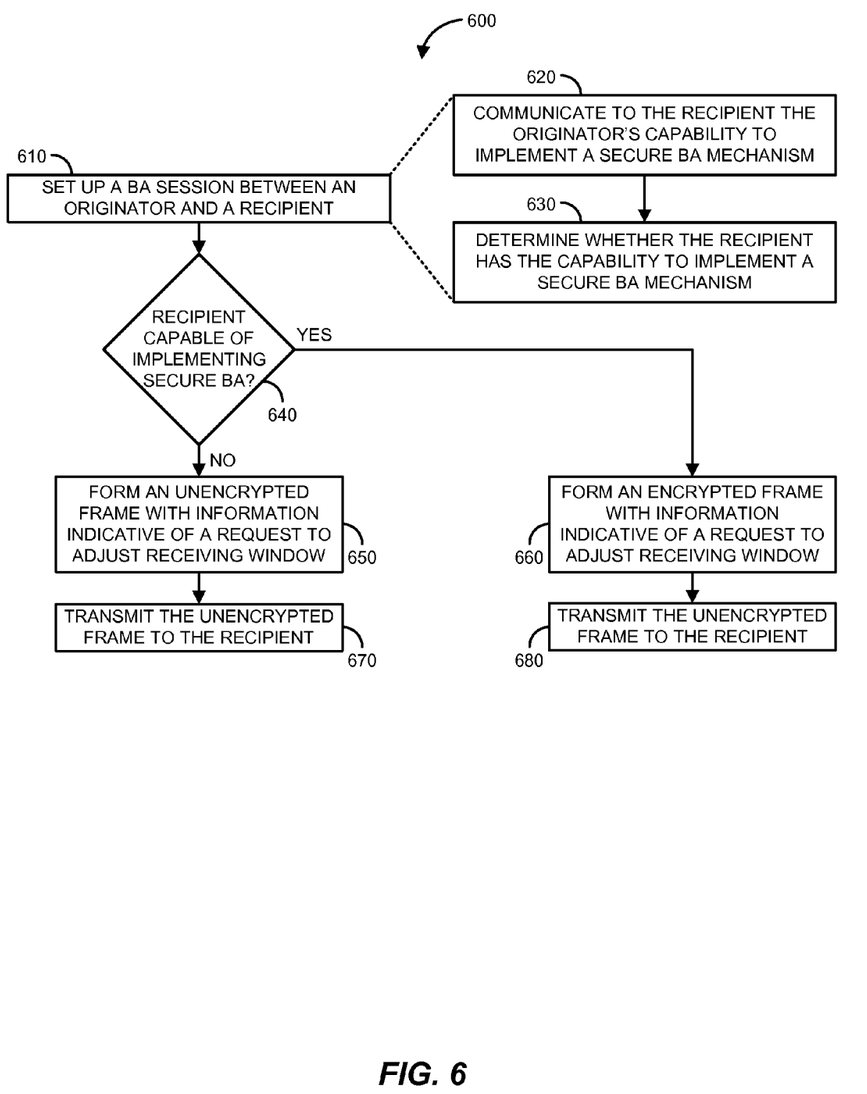
FIG. 6 is a flow diagram of an example secure block acknowledgement method that may be employed by an originator.

FIG. 6 is a flow diagram of an example secure BA method 600 that may be employed by an originator, such as the originator 300 of FIG. 3. For ease of explanation, FIG. 6 will be described with reference to FIGS. 1 and 2-5. It will be understood, however, that the example secure BA method 600 may be utilized with systems and devices other than those illustrated in FIGS. 1 and 2-5.

In order to employ the secure BA method 600, the originator sets up a BA session with the recipient (block 610), e.g., via the secure block acknowledgement engine 350 and the communication interface 310, as described above, for example, in reference to FIG. 5. During the set-up of the BA session, the originator communicates to the recipient (e.g., via the BA session setup request frame described in reference to FIG. 5) whether the originator has a capability to implement a BA mechanism in a secure manner (block 620). The originator also determines (e.g., from the BA session setup response frame described in reference to FIG. 5) whether the recipient has a capability to implement a BA mechanism in a secure manner (block 630). If the recipient does not have the capability to implement a BA mechanism in a secure manner ("NO" branch of block 640), the originator forms an unencrypted window adjustment action frame that includes information indicative of a request for the recipient to adjust its receiving window (block 650). The originator then transmits the unencrypted window adjustment action frame to the recipient (block 670) via the communication interface 310, potentially causing the recipient to adjust its receiving window.

If the recipient does have the capability to implement a BA mechanism in a secure manner ("YES" branch of block 640), the originator forms an encrypted window adjustment action frame that includes information indicative of a request for the recipient to adjust its receiving window (block 660). The originator forms the encrypted frame using the frame encryption engine 340 and then transmits the encrypted window adjustment action frame to the recipient (block 680) via the communication interface 310, potentially causing the recipient to adjust its receiving window.

The encryption of the window adjustment action frame can be performed at the frame encryption engine 340 in a variety of ways. Any suitable encryption techniques, such as the techniques described in the IEEE 802.11w Standard, for example, can be used to encrypt the window adjustment action frame. In some embodiments, the window adjustment action frame can be an encrypted frame that includes some or all data associated with the ADDBA request frame, as originally defined in the IEEE 802.11e Standard. As explained above, the ADDBA request frame, as originally defined in the IEEE 802.11e Standard, includes data regarding the receiving window parameters (such as $WinSize_R$, $WinEnd_R$ and $WinStart_R$) for a new BA session. This data regarding the receiving window parameters can be included in the window adjustment action frame to indicate a request to adjust the window, e.g., to advance $WinStart_R$ to a new sequence number. In other embodiments, the window adjustment action frame may be unrelated the ADDBA request frame, as originally defined in the IEEE 802.11e Standard, and may include data that indicates a request to adjust the receiving window in a different manner.

Figure 7:
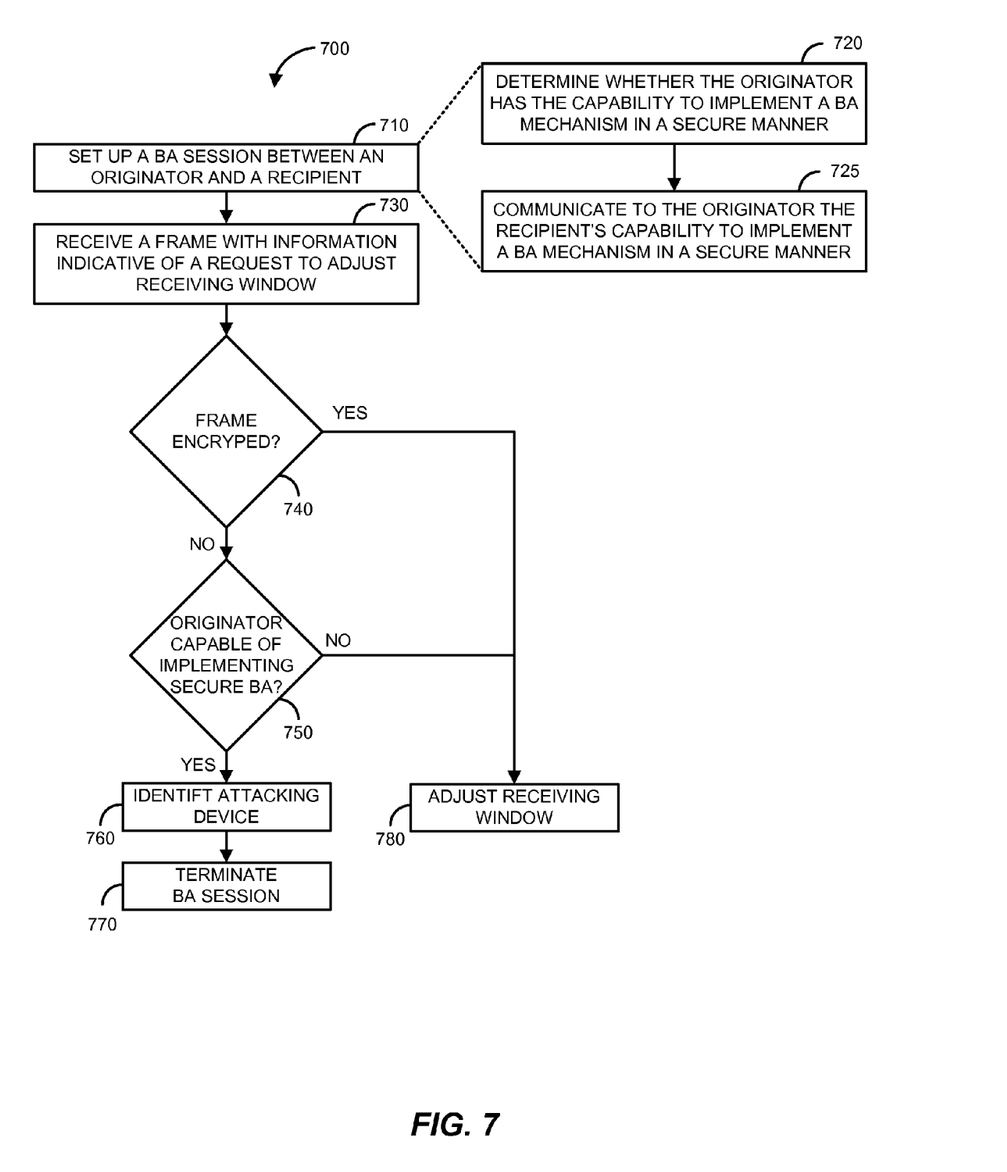
FIG. 7 is a flow diagram of an example secure block acknowledgement method that may be employed by a recipient.

FIG. 7 is a flow diagram of an example secure BA method 600 that may be employed by a recipient, such as the recipient 400 of FIG. 4. For ease of explanation, FIG. 7 will be described with reference to FIGS. 1 and 2-5. It will be understood, however, that the example secure BA method 700 may be utilized with systems and devices other than those illustrated in FIGS. 1 and 3-5.

In order to employ the secure BA method 700, the recipient can set up a BA session with the originator (block 710), e.g., via the secure block acknowledgement engine 450 and the communication interface 410, as described above, for example, in reference to FIG. 5. During the set-up of the BA session, the recipient determines (e.g., from the BA session setup request frame described in reference to FIG. 5) whether the originator has a capability to implement a BA mechanism in a secure manner (block 720). The recipient also communicates to the originator (e.g., via the BA session setup response frame described in reference to FIG. 5) whether the recipient has a capability to implement a BA mechanism in a secure manner (block 725).

If the recipient and the originator have the capability to implement a BA mechanism in a secure manner, when the recipient receives a window adjustment action frame that includes information indicative of a request for the recipient to adjust its receiving window (block 730), the recipient adjusts its receiving window (block 780) if the received window adjustment action frame is encrypted ("YES" branch of block 740). The recipient also adjusts its receiving window (block 780) in response to an unencrypted window adjustment action frame ("YES" branch of block 740) if it is determined that the originator does not have the capability to implement a BA mechanism in a secure manner ("NO" branch of block 750). On the other hand, if the received window adjustment action frame is not encrypted ("NO" branch of block 740), and it is determined that the originator does have the capability to implement a BA mechanism in a secure manner ("YES" branch of block 750), the received window adjustment action frame is dropped, and the receiving window is not adjusted. Additionally, in some embodiments, the originator is identified as an attacking, or a rogue, device (block 760). Consequently, the BA session with the originator (and possibly all outstanding BA sessions with the originator) is terminated (block 770).

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in on any computer readable memory medium such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

What is claimed is:

1. A method, comprising:
    setting up a session with a transmitting station in which the transmitting station is to perform a block acknowledgment to confirm receipt of a plurality of packets, the session including determining whether the transmitting station has a capability to implement a mechanism to securely perform a block acknowledgement;
    during the session, receiving an information unit including information indicative of a request for the communication device to adjust a receiving window associated with the session;
    determining whether the received information unit is in accordance with the mechanism;
    adjusting the receiving window if the received information unit is in accordance with the mechanism; and
    not adjusting the receiving window if (i) the received information unit is not in accordance with the mechanism, and (ii) the transmitting station is determined to have the capability to implement the mechanism.

2. The method of claim 1, wherein not adjusting the receiving window comprises not adjusting the receiving window if (i) the received information unit is an unencrypted, overloaded block acknowledgement request (BAR), and (ii) the transmitting station is determined to have the capability to implement the mechanism.

3. The method of claim 2, further comprising identifying a station that transmitted the unencrypted, overloaded BAR as an attacking station if the transmitting station is determined to have the capability to implement the mechanism.

4. The method of claim 2, further comprising tearing down the session if (i) the received information unit is an unencrypted, overloaded BAR, and (ii) the transmitting station is determined to have the capability to implement the mechanism.

5. The method of claim 1, wherein not adjusting the receiving window comprises not adjusting the receiving window if (i) the received information unit is an unencrypted, overloaded multi-TID block acknowledgement request (MT-BAR), and (ii) the transmitting station is determined to have the capability to implement the mechanism.

6. The method of claim 5, further comprising identifying a station that transmitted the unencrypted, overloaded MTBAR as an attacking station if the transmitting station is determined to have the capability to implement the mechanism.

7. The method of claim 1, wherein:
    determining whether the received information unit is in accordance with the mechanism comprises determining whether the received information unit is encrypted; and
    not adjusting the receiving window comprises not adjusting the receiving window if (i) the received information unit is not encrypted, and (ii) the transmitting station is determined to have the capability to implement the mechanism.

8. The method of claim 1, wherein determining whether the transmitting station has the capability to implement the mechanism comprises receiving, from the transmitting station, data indicative of whether the transmitting station has the capability to implement a mechanism in a secure manner.

9. The method of claim 1, further comprising identifying a station that transmitted the information unit as an attacking station if (i) the received information unit is not in accordance with the mechanism, and (ii) the transmitting station is determined to have the capability to implement the mechanism.

10. The method of claim 1, further comprising terminating the block acknowledgement session with the transmitting station if (i) the received information unit is not in accordance with the mechanism, and (ii) the transmitting station is determined to have the capability to implement the mechanism.

11. The method of claim 1, further comprising terminating all outstanding block acknowledgement sessions with the transmitting station if (i) the received information unit is not in accordance with the mechanism, and (ii) the transmitting station is determined to have the capability to implement the mechanism.

12. The method of claim 1, further comprising dropping the received information unit if (i) the received information unit is not in accordance with the mechanism, and (ii) the transmitting station is determined to have the capability to implement the mechanism.

13. The method of claim 1, wherein the information indicative of the request for the receiving station to adjust the receiving window comprises at least one of i) a starting sequence number, ii) an ending sequence number, and iii) a window size associated with the receiving window.

14. A communication device, comprising:
    a communication interface configured to receive an information unit during a session with a transmitting station, the information unit including information indicative of a request for the communication device to adjust a receiving window associated with a block acknowledgement session; and
    a secure block acknowledgement engine configured to set up, prior to receiving the information unit, the block acknowledgement session with the transmitting station, including determining whether the transmitting station has a capability to implement a secure block acknowledgement mechanism while setting up the block acknowledgement session, determine whether the received information unit is in accordance with the secure block acknowledgement mechanism, adjust the receiving window if the received information unit is in accordance with the secure block acknowledgement mechanism, and not adjust the receiving window if (i) the received information unit is not in accordance with the secure block acknowledgement mechanism, and (ii) the transmitting station is determined to have the capability to implement the secure block acknowledgement mechanism.

15. The communication device of claim 14, wherein the secure block acknowledgement engine is configured to not adjust the receiving window if (i) the received information unit is an unencrypted, overloaded block acknowledgement request (BAR), and (ii) the transmitting station is determined to have the capability to implement the secure block acknowledgement mechanism.

16. The communication device of claim 15, wherein the secure block acknowledgement engine is configured to identify a station that transmitted the unencrypted, overloaded BAR as an attacking station if the transmitting station is determined to have the capability to implement the secure block acknowledgement mechanism.

17. The communication device of claim 15, wherein the secure block acknowledgement engine is configured to tear down the block acknowledgment session if (i) the received information unit is an unencrypted, overloaded BAR, and (ii) the transmitting station is determined to have the capability to implement the secure block acknowledgement mechanism.

18. The communication device of claim 14, wherein the secure block acknowledgement engine is configured to not adjust the receiving window if (i) the received information unit is an unencrypted, overloaded multi-TID block acknowledgement request (MTBAR), and (ii) the transmitting station is determined to have the capability to implement the secure block acknowledgement mechanism.

19. The communication device of claim 18, wherein the secure block acknowledgement engine is configured to identify a station that transmitted the unencrypted, overloaded MTBAR as an attacking station if the transmitting station is determined to have the capability to implement the secure block acknowledgement mechanism.

20. The communication device of claim 14, wherein the secure block acknowledgement engine is configured to:

determine whether the received information unit is encrypted; and not adjust the receiving window if (i) the received information unit is not encrypted, and (ii) the transmitting station is determined to have the capability to implement the secure block acknowledgement mechanism.

21. The communication device of claim 14, wherein the secure block acknowledgement engine is configured to determine whether the transmitting station has the capability to implement the secure block acknowledgment mechanism based on data, received from the transmitting station, that is indicative of whether the transmitting station has the capability to implement a block acknowledgment mechanism in a secure manner.

22. The communication device of claim 14, wherein the secure block acknowledgement engine is configured to identify a station that transmitted the information unit as an attacking station if (i) the received information unit is not in accordance with the secure block acknowledgement mechanism, and (ii) the transmitting station is determined to have the capability to implement the secure block acknowledgement mechanism.

23. The communication device of claim 14, wherein the secure block acknowledgement engine is configured to terminate the block acknowledgement session with the transmitting station if (i) the received information unit is not in accordance with the secure block acknowledgement mechanism, and (ii) the transmitting station is determined to have the capability to implement the secure block acknowledgement mechanism.

24. The communication device of claim 14, wherein the secure block acknowledgement engine is configured to terminate all outstanding block acknowledgement sessions with the transmitting station if (i) the received information unit is not in accordance with the secure block acknowledgement mechanism, and (ii) the transmitting station is determined to have the capability to implement the secure block acknowledgement mechanism.

25. The communication device of claim 14, wherein the secure block acknowledgement engine is configured to drop the received information unit if (i) the received information unit is not in accordance with the secure block acknowledgement mechanism, and (ii) the transmitting station is determined to have the capability to implement the secure block acknowledgement mechanism.

26. The communication device of claim 14, wherein the information indicative of the request for the receiving station to adjust the receiving window comprises at least one of i) a starting sequence number, ii) an ending sequence number, and iii) a window size associated with the receiving window.

* * * * *